United States Patent [19]

Tanno et al.

[11] 4,276,700
[45] Jul. 7, 1981

[54] METHOD FOR INSPECTING GEAR CONTACT PATTERNS

[75] Inventors: Takashi Tanno; Shigemitsu Koike, both of Hiroshima, Japan

[73] Assignee: Toyo Kogyo Co., Ltd., Hiroshima, Japan

[21] Appl. No.: 174,582

[22] Filed: Aug. 1, 1980

[30] Foreign Application Priority Data

Aug. 2, 1979 [JP] Japan ................................. 54-98829

[51] Int. Cl.³ ............................................. G01B 3/14
[52] U.S. Cl. ........................... 33/179.5 R; 33/179.5 D; 33/174 P
[58] Field of Search .................. 33/179.5 R, 179.5 D, 33/174 P, 174 L

[56] References Cited

U.S. PATENT DOCUMENTS

| | | | |
|---|---|---|---|
| 3,276,135 | 10/1966 | McCardell | 33/179.5 R |
| 3,741,659 | 6/1973 | Jones, Jr. | 33/179.5 R |
| 3,849,892 | 11/1974 | Fabish et al. | 33/179.5 R |
| 3,945,126 | 3/1976 | Bloch | 33/179.5 R |
| 3,950,858 | 4/1976 | Donner et al. | 33/179.5 R |
| 3,952,418 | 4/1976 | Akamatsu et al. | 33/179.5 R |
| 4,166,323 | 9/1979 | Maag | 33/179.5 R |

*Primary Examiner*—Willis Little
*Attorney, Agent, or Firm*—Fleit & Jacobson

[57] ABSTRACT

In a pair of intermeshing gear teeth each having a tooth surface, the gear contact pattern is inspecting by steps of measuring each tooth surface at a regularly positioned measuring points to detect deviations from a standard gear profile at corresponding measuring points, calculating relative distances between the teeth surfaces at the measuring points, and counting the number of combinations of measuring points wherein the relative distances are within a predetermined limit. Where the counted number is greater than a predetermined value, the pair of gears are accepted.

8 Claims, 12 Drawing Figures

FIG. 3
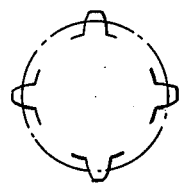
FIG. 4
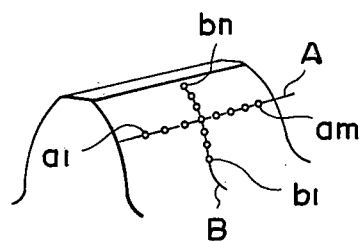
FIG. 5
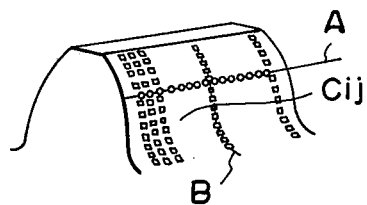
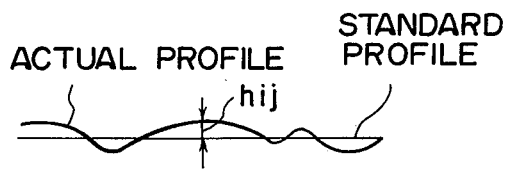
FIG. 6a
FIG. 6b

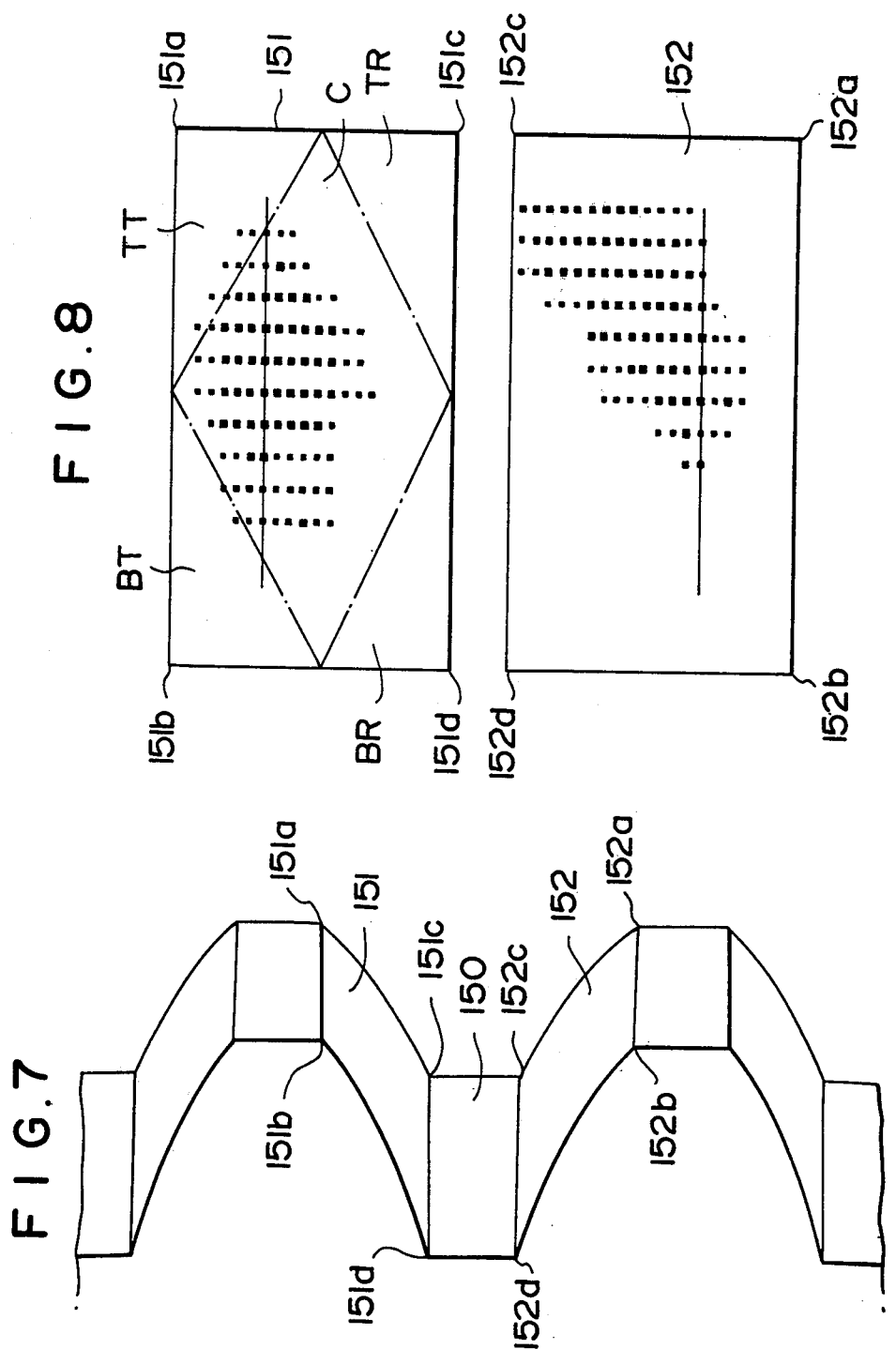

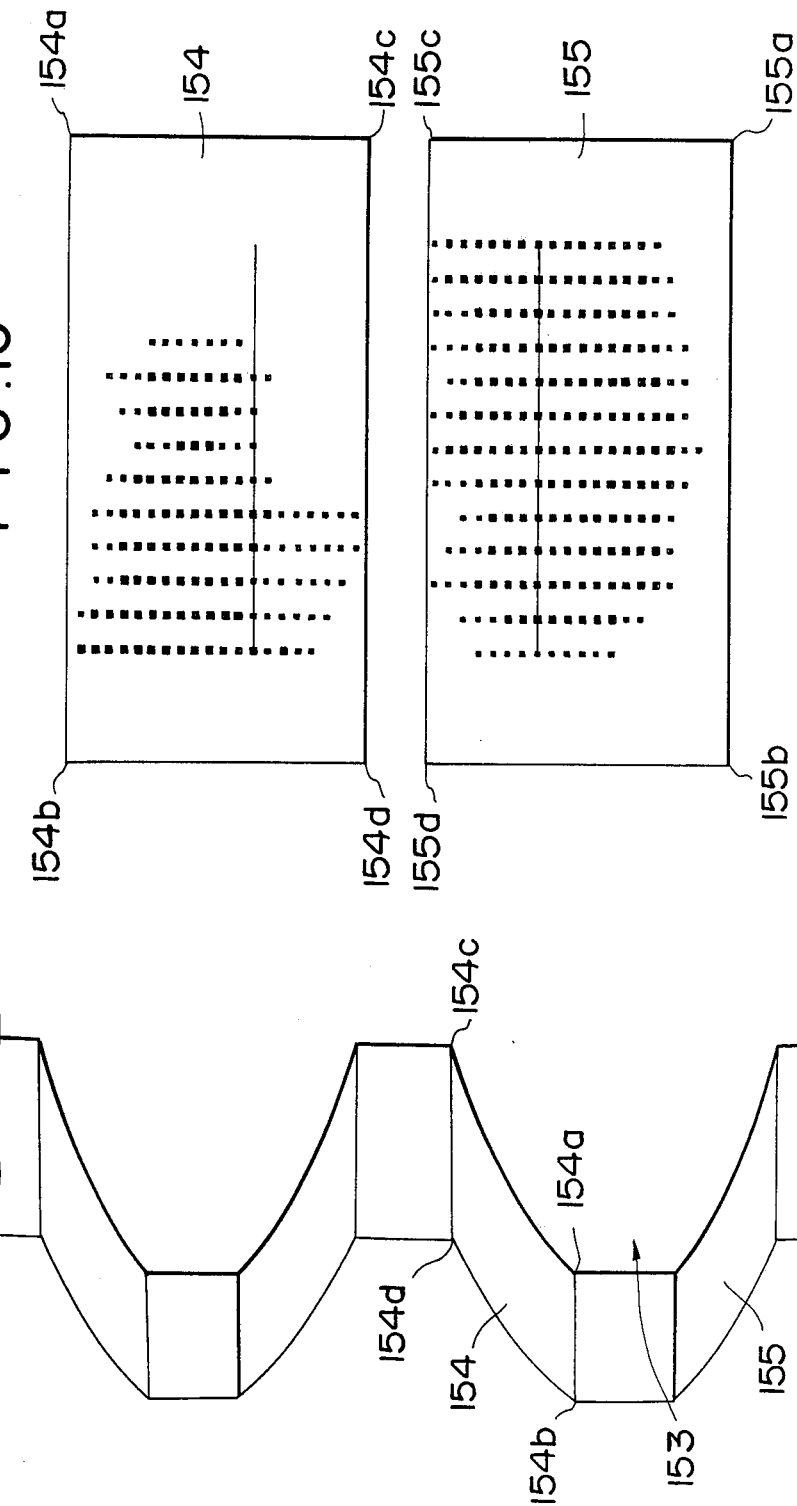

FIG.11
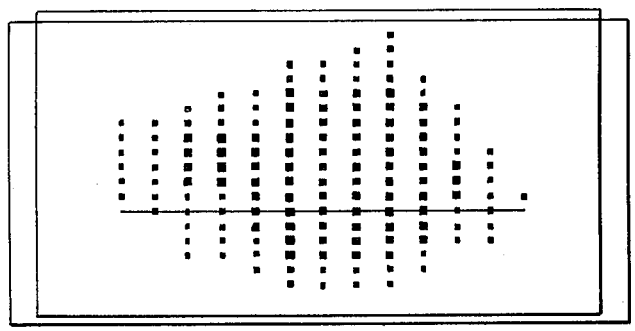
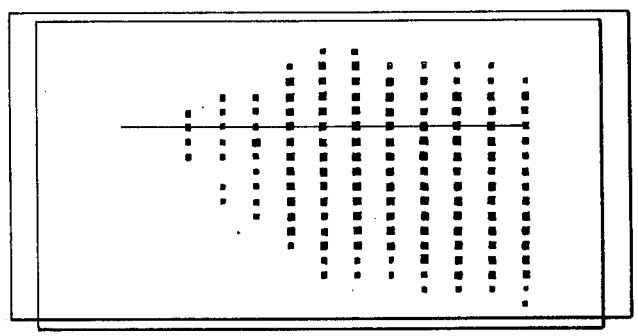

METHOD FOR INSPECTING GEAR CONTACT PATTERNS

The present invention relates to gear manufacturing, and more particularly to a method for inspecting gear contact patterns.

In general, processes for gear manufacturing are under a strict control, however, since there are various factors such as quenching conditions which may have influences on the quality of products, gears manufactured in one lot may be of different quality from those in other manufacturing lots. It has thus been required to have the gears in each manufacturing lot inspected for quality. Particularly, in case of gears that are to be driven under a high speed, it is very important to inspect the gear contact patterns because a poor contact between mutually meshing gear teeth surfaces may often cause damages of the gear teeth and produce an unacceptably high noise.

Conventionally, in order to inspect the gear contact patterns, there has been provided a master or reference gear which is adapted to be applied with paint and brought into a meshing engagement with a gear to be tested. Thus, the paint on the master gear is partially transferred to the gear to be tested and the transferred paint pattern is visually inspected as representing the gear contact pattern. It should however be pointed out that the conventional method is not sufficiently precise because the accuracy of the master gear as well as the thickness of the paint coating have influences on the result of the inspection.

In view of the above problems, the applicants have proposed by the U.S. patent application Ser. No. 168,702, filed July 14, 1980, which corresponds to Japanese patent applications Nos. 54-89457 and 54-110851 respectively filed on July 14 and Aug. 29, 1979 a method for inspecting gear contact patterns in which a gear tooth surface is measured at matrix positions in terms of deviations from a standard or reference tooth profile and counting is made on the number of measuring points wherein the deviations are within a predetermined value. Where the counted number is greater than a predetermined limit, the gear is accepted. In the aforementioned application, there are described several modified processes.

It is an object of the present invention to provide a method which is an improvement over the method proposed by the aforementioned copending application.

Another object of the present invention is to provide a method for inspecting a gear contact pattern between a pair of mutually engaging gears.

A further object of the present invention is to provide a reliable and precise method for finding an acceptable pair of gears.

According to the present invention, the above and other objects are accomplished by a method for inspecting a gear contact pattern between teeth surfaces of mutually engaging gear teeth in a pair of gears which comprises steps of determining on each of the teeth surfaces of the gear teeth a plurality of regularly located measuring points so that respective ones of the measuring points on one tooth surface correspond to the measuring points on the other tooth surface so as to provide a plurality of combinations of measuring points, measuring each tooth surface at the measuring points to detect deviations of the tooth surface from a standard tooth profile at the measuring points, calculating relative distances between the teeth surfaces in the pair of gears at corresponding measuring points on the basis of the deviations, determining a reference which is the relative distance of minimum value, counting number of the combinations of measuring points in the pair of mutually engaging teeth surfaces where the relative distances are within a predetermined limit from the reference, determining a gear contact ratio on the basis of a ratio of the counted number of the combinations of measuring points to the total number of the combinations of measuring points so that the pair of the gears accepted where the gear contact ratio is greater than a predetermined value. The measuring points may be located in a matrix pattern and, in one mode of the present invention, counting is made on the number of pairs of the measuring points where the relative distances are not greater than 6 microns. The predetermined value for the gear contact ratio may for example by 0.50.

In a preferable aspect of the present invention, the aforementioned process is preceded by a preliminary measuring process which comprises steps of selecting a plurality of gear teeth in each of the pair of gears, measuring each of the gear teeth at a plurality of regularly located measuring points to detect deviations of the gear tooth from a standard tooth profile at the measuring points, obtaining mean values of the deviations of the selected gear teeth at the respective measuring points, and selecting among the gear teeth a specific gear tooth which has largest number of measuring points where the deviations are closest to the mean values to put it to the aforementioned inspection. In a further aspect of the present invention, each gear tooth surface is divided into a plurality of zones, such as four triangular corner zones and a diamond-shaped center zone. The number of pairs of measuring points wherein the relative distances are within the acceptable limit is counted in each of such zones so as to detect the distribution of acceptable pairs of measuring points.

The above and other objects and features of the present invention will become apparent from the following descriptions of preferred embodiments taking reference to the accompanying drawings, in which:

FIG. 3 is a front view of a gear showing one example of selection of gear teeth for a preliminary inspection;

FIG. 4 is a perspective view of a gear tooth showing the measuring points for the preliminary inspection;

FIG. 5 is a perspective view of a gear tooth showing the measuring points for the final inspection;

FIG. 6(a) shows an example of deviations of one tooth from a standard profile;

FIG. 6(b) is a diagram similar to FIG. 6(a) but showing the deviations in the other cooperating tooth;

FIG. 7 is a fragmentary perspective view of a ring gear to which the method of the present invention is being applied;

FIG. 8 shows an example of distributions of acceptable measuring points on the teeth surfaces of the ring gear shown in FIG. 7;

FIG. 9 is a fragmentary perspective view of a main shaft gear to which the method of the present invention is being applied;

FIG. 10 shows an example of distributions of acceptable measuring points on the teeth surfaces of the gear shown in FIG. 9; and FIG. 11 shows the distributions of acceptable measuring points when the gear in FIG. 7 is meshed with the gear in FIG. 9.

Figure 1:
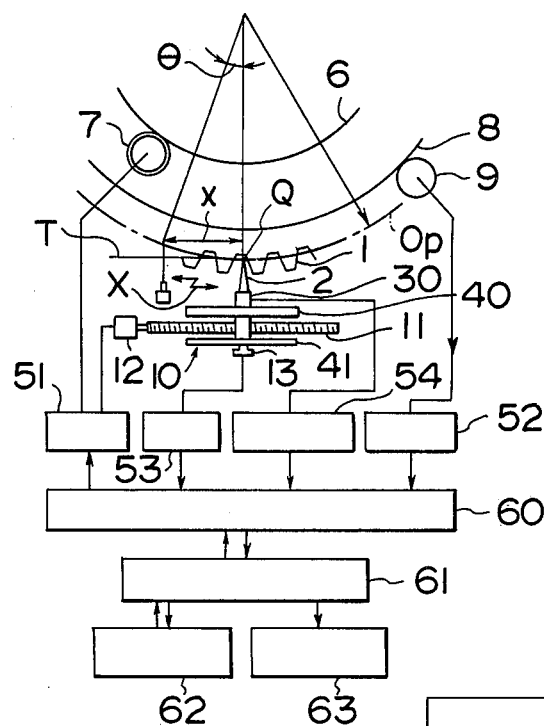
FIG. 1 is a diagrammatical front view of a gear inspection device in accordance with one embodiment of the present invention.
Figure 2:
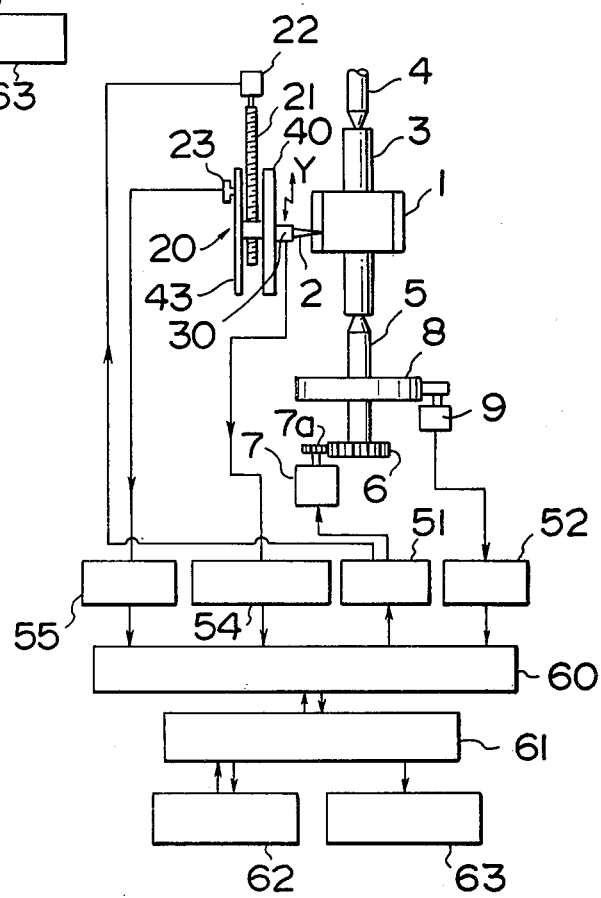
FIG. 2 is a diagrammatical side view of the gear inspection device shown in FIG. 1.

Referring now to the drawings, particularly to FIGS. 1 and 2, there is shown a device for inspecting a gear. In the specific example, a spur gear 1 is being inspected. The device includes a detecting probe 2 which extends radially with respect to the gear 1 and has a tip end adapted to be brought into contact with a tooth of the gear 1. As shown in FIG. 2, the gear 1 is carried by a shaft 3 which is coaxial with the gear 1 and supported at the opposite ends by axially aligned shafts 4 and 5. The shaft 5 has a driven gear 6 which is secured thereto and in meshing engagement with a pinion 7a on an output shaft of a pulse motor 7 so that the shaft 5 and thus the gear 1 is incrementaly driven by the pulse motor 7. The shaft 5 is further provided with an indexing disc 8 which cooperate with a rotary encoder 9 for detecting the angular position of the gear 1 in terms of a digital pulse signal.

The detecting probe 2 is mounted on a detector 30 which is in turn mounted on a carriage 40 carried by an X-direction transfer mechanism 10 and a Y-direction transfer mechanism 20 so that the probe 2 can be driven for incremental movements in both the X and Y directions. As shown in FIG. 1, the transfer mechanism 10 comprises a drive screw shaft 11 which is driven by a pulse motor 12. Similarly, the transfer mechanism 20 comprises a drive screw shaft 21 which is driven by a pulse motor 22.

The carriage 40 is provided with an X-direction rod 41 which cooperates with a linear encoder 13 for detecting the movement x of the detecting probe 2 in the X-direction or the direction parallel with a tangent line T drawn on the base circle Op at the reference point Q as shown in FIG. 1. The carriage 40 is further provided with a Y-direction rod 43 which cooperates with a linear encoder 23 for detecting the movement y of the probe 2 in the Y-direction or the direction parallel with the axis of the gear 1 as shown in FIG. 2. The detector 30 supports the base portion of the probe 2 so as to bias the probe 2 into contact with the tooth surface of the gear 1, and functions to produce an analogous signal representing the amount of linear and/or angular displacement of the probe 2 whereby the actual position of the tip of the probe 2 can be detected.

In actual operation, when it is desired to inspect for example a normal tooth profile, the pulse motor 7 for driving the gear 1 and the pulse motor 12 for driving the probe 2 in the X-direction are synchronously energized so that the spur gear 1 is incrementary rotated in the clockwise direction and the detecting probe 2 is incrementally driven in the X-direction. The angle $\theta$ of rotation of the spur gear 1 is detected by a counter 52 which receives signals from the rotary encoder 9. The output of the counter 52 is applied through an interface 60 to a computer 61. The amount of X-direction movement x of the probe 2 is detected by a counter 53 which receives digital signals from the linear encoder 13. The output of the counter 53 is applied through the interface 60 to the computer 61. In a standard tooth profile, the relationship between the amount x of the X-direction movement of the probe 2 and the angle $\theta$ of the rotation of the gear 1 is represented by $x = R \cdot \theta$, where R is the radius of the base circle Op.

In order for detecting the actual position of the tip of the probe 2, the analogous signal from the detector 30 is applied to an A/D converter 54 which converts the analoguous signal into a digital signal and applies its output signal through the interface 60 to the computor 61. The Y-direction movement y of the probe 2 may be detected as desired by a counter 55 which receives signals from the linear encoder 23 and applied its output through the interface 60 to the computer 61. The output of the computor 61 is connected with a printer 62 and an X-Y plotter 63.

The inspection of the gear contact pattern may be carried out in accordance with the following procedure.

(I) Selection of Teeth Surfaces for a Preliminary Inspection (a) Sampling of Gears A pair of gears are at first taken out randomly for inspection from two different manufacturing lots.

(b) Selection of Gear Teeth

As shown in FIG. 3, four gear teeth may be selected in each gear for preliminary inspection. The selected gear teeth may be the ones which are angularly spaced apart from each other by 90°.

(c) Preliminary Inspection

With respect to each of the selected gear teeth, measuring points $a_1$, $a_2-a_m$; $b_1$, $b_2-b_n$ are determined respectively along a line A which is an intersection of the base circle Op on the tooth surface and a line B which is the intermeshing center line on the tooth surface. Along the line A, the points $a_1$, $a_2-a_m$ are equally spaced. Similarly, the points $b_1$, $b_2-b_n$ are also equally spaced along the line B.

At the respective measuring points, the tooth surface is detected in terms of the position of the tip of the probe 2. The results of the measurements are applied to the computer 61 and an operation is carried out to determine the deviations $h(a_1)$, $h(a_2)-h(a_m)$; $h(b_1)$, $h(b_2)-h(b_n)$ of the tooth surface from the standard tooth profile at respective measuring points. The measurements are made on all of the selected gear teeth and a mean value of the deviations is calculated among the selected gear teeth with respect to each of the measuring points.

(d) Selection of a Gear Surface for Final Inspection

Among the teeth surfaces of the selected gear teeth, selection is made of one surface of which deviations are closest to the mean values of the deviations to put the particular surface into the final inspection. In actual practice, the selection of tooth surface may be made in a simpler way by choosing a limited number of measuring points. For example, where there are 200 measuring points $a_1$, $a_2-a_{200}$ along the line A and 100 measuring points $b_1$, $b_2-b_{100}$ along the line B, the points $a_{40}$, $a_{160}$; $b_{20}$, $b_{80}$ may be selected. Then, the differences between the deviations at the points $a_{40}$ and $a_{160}$, and between the deviations at the points $b_{20}$ and $b_{80}$ are calculated in each tooth surface. At the same time, mean values of the deviations at the points $a_{40}$ and $a_{160}$; and $b_{20}$ and $b_{80}$ are respectively calculated to obtain the differences between the mean values at the points $a_{40}$ and and $a_{160}$ and between the mean values at the points $b_{20}$ and $b_{80}$. Thereafter, the difference between the mean values of the deviations at the points $a_{40}$ and $a_{160}$ is compared with the difference between the deviations at the points $a_{40}$ and $a_{160}$ in each of the selected teeth surfaces to obtain a difference therebetween, which may be referred to as an "axial gradient difference". Similarly, the difference between the mean values of the deviations at the points $b_{20}$ and $b_{80}$ is compared with difference between the deviations at the points $b_{20}$ and $b_{80}$ in each of the selected teeth surfaces to obtain a difference therebetween, which may be referred to as a "radial gradient difference". With respect to each of the selected teeth surfaces, the axial gradient difference is added to the radial gradient difference and the sum of such differences is compared with those of the other teeth surfaces. The tooth surface which has the smallest value of such sum is selected for the final inspection.

(II) Final Inspection (a) Measuring Points

As shown in FIG. 5, measuring matrix points $C_{ij}$=-($i=1$-m; $j=1$-n) are determined on one of the teeth surfaces of the sampled gears along equi-spaced lines parallel with the line A and equi-spaced lines parallel with the line B and the detecting probe 2 is moved to these measuring points to carry out the measurement. Similarly, measuring matrix points $C'_{ij}$ are determined on the other tooth surface.

(b) Measurement of Deviations at Respective Measuring Points

The results of the measurements at the respective measuring points $C_{ij}$ are compared in the computer 61 with the standard profile to obtain deviations $h_{ij}$ therefrom in one of the gears as shown in FIG. 6(a). Similar calculations are also made on the other gear to obtain deviations $h'_{ij}$ as shown in FIG. 6(b).

(c) Calculation of Gear Contact Pattern (i) Based on the deviations $h_{ij}$ and $h'_{ij}$ at the measuring points $C_{ij}$ and $C'_{ij}$, respectively, on the teeth surfaces of the pair of gears, a relative distance $\delta_{ij}$ is obtained from an equation $\delta_{ij} = 1_o - h_{ij} - h'_{ij}$, where $1_o$ is the distance between the intermeshing teeth surfaces of standard profiles.

(ii) Then, counting is made of the number k of the combinations of the measuring points ($C_{ij}$, $C'_{ij}$) wherein the relative distances $\delta_{ij}$ are within a predetermined range between $\delta$ and $\delta + \Delta$. In case of automobile gears, the value $\Delta$ is approximately 6 microns, and should preferably be 2 microns. The number k is compared with the total number N ($=m \times n$) of the combinations of the measuring points and the ratio q of the number k to the number N is calculated. Where the ratio q is not smaller than a predetermined value $\alpha$, the combination of the gears is accepted. The value $\alpha$ may be determined in accordance with the materials and applications of the gears. In case of automobile gears, particularly transmission gears, the value $\alpha$ should be approximately 0.50. According to this method, even when one lot of gears of a first type is found unacceptable when combined with one lot of gears of a second type, the lot of the first type gears may be accepted by combining with another lot of the second type gears. Thus, the percentage of acceptable gears can be significantly increased.

Referring now to FIGS. 7 through 11, there is shown a further embodiment of the present invention. FIG. 7 shows a ring gear 150 having a drive side tooth surface 151 and a coast side tooth surface 152. The tooth surface 151 has a top side tip corner 151a, a bottom side tip corner 151b, a top side root corner 151c and a bottom side root corner 151d. Similarly, the tooth surface 152 has a top side tip corner 152a, a bottom side tip corner 152b, a top side root corner 152c and a bottom side root corner 152d. As shown in FIG. 8, the tooth surface 151 is divided into four triangular corner zones TT, BT, TR and BR and a diamond shaped center zone C. Black dots show measuring points wherein the deviations are within a predetermined limit from a standpoint profile. In this embodiment, the number of the black dots is counted in each zone. Since the center zone C is four times in area as large as the corner zone, the number of the black dots in the zone C is divided by four. The tooth surface is classified by the zone wherein the counted number is the largest. For example, where the counted number is largest in the zone C, the tooth surface is referred to as the type C. Similarly, the types TT, BT, TR and BR are defined where the counted numbers are the largest in the zones TT, BT, TR and BR, respectively. When the counted numbers are the same in two or more areas, preference is taken in the order C, TT, BT, TR and BR. For example, where the counted numbers are the same in the zones C and TT, the tooth surface is referred to as the type C. Where the counted numbers are the same in the zones TR and BR, the tooth surface is referred to as the type TR.

The tooth surface of type C may be judged as being acceptable without considering the combination with a cooperating gear. In the example shown in FIG. 8, the surface 151 is of the type C whereas the surface 152 is of the type TR.

Referring to FIGS. 9 and 10, there is shown a main shaft gear 153 having a driving side tooth surface 154 and a coast side tooth surface 155. The tooth surface 154 has a top side tip corner 154a, a bottom side tip corner 154b, a top side root corner 154c and a bottom side root corner 154d. Similarly, the tooth surface 155 has a top side tip corner 155a, a bottom side tip corner 155b, a top side root corner 155c and a bottom side root corner 155d. In this example, the tooth surface 154 is of the type BR, whereas the tooth surface 155 is of the type C.

When the gears 150 and 153 are meshed with each other, the combination of the tooth surfaces becomes the one of type C as shown in FIG. 11. It should therefore be judged that the combination of the gears 150 and 153 are acceptable. It has been found that a type C combination can very often be obtained by a combination of the tooth surface types as shown in the table.

TABLE

| COMBINATION OF TOOTH SURFACES | |
|---|---|
| TYPE | COOPERATING TOOTH SURFACES |
| C | C, BT, BR, TT, TR |
| BT | C, TT |
| BR | C, TR |
| TT | C, BT |
| TR | C, BR |

The invention has thus been shown and described with reference to specific examples, however, it should be noted that the invention is in no way limited to the details of these examples but changes and modifications may be made without departing from the scope of the appended claims.

We claim:

1. Method for inspecting a gear contact pattern between teeth surfaces of mutually engaging gear teeth in a pair of gears which comprises steps of determining on each of the teeth surfaces of the gear teeth a plurality of regularly located measuring points so that respective ones of the measuring points on one tooth surface correspond to the measuring points on the other tooth surface so as to provide a plurality of combinations of measuring points, measuring each tooth surface at the measuring points to detect deviations of the tooth surface from a standard tooth profile at the measuring points, calculating relative distances between the teeth surfaces in the pair of gears at corresponding measuring points on the basis of the deviations, determining a reference which is the relative distance of minimum value, counting number of the combinations of measuring points in the pair of mutually engaging teeth surfaces where the relative distances are within a predetermined limit from the reference, determining a gear contact ratio on the basis of a ratio of the counted number of the combinations of measuring points to the total number of the combinations of measuring points so that the pair of the gears accepted where the gear contact ratio is greater than a predetermined value.

2. Method in accordance with claim 1 in which said measuring points are in a equi-spaced matrix pattern.

3. Method in accordance with claim 1, said method being applied for inspecting a gear contact pattern in a pair of cooperating gears for automobile use, said predetermined limit of the deviation being 6 microns.

4. Method in accordance with claim 3 in which said predetermined value of the gear contact ratio is 0.50.

5. Method for inspecting a gear contact pattern in a pair of cooperating gears, said method including a preliminary measuring process which comprises steps of selecting a plurality of gear teeth in each of the pair of gears, measuring each of the gear teeth at a plurality of regularly located measuring points to detect deviations of the gear tooth from a standard tooth profile at the measuring points, obtaining mean values of the deviations of the selected gear teeth at the respective measuring points, and selecting among the gear teeth a specific gear tooth which has largest number of measuring points where the deviations are closest to the mean values; and a final measuring process which comprises steps of determining on each of the teeth surfaces of the gear teeth a plurality of regularly located measuring points so that respective ones of the measuring points on one tooth surface correspond to the measuring points on the other tooth surface so as to provide a plurality of combinations of measuring points, measuring each tooth surface at the measuring points to detect deviations of the tooth surface from a standard tooth profile at the measuring points, calculating relative distances between the teeth surfaces in the pair of gears at corresponding measuring points on the basis of the deviations, determining a reference which is the relative distance of minimum value, counting number of the combinations of measuring points in the pair of mutually engaging teeth surfaces where the relative distances are within a predetermined limit from the reference, determining a gear contact ratio on the basis of a ratio of the counted number of the combinations of measuring points to the total number of the combinations of measuring points so that the pair of the gears accepted where the gear contact ratio is greater than a predetermined value.

6. Method in accordance with claim 5 in which said pair of gears are sampled from different manufacturing lots so that the gears represent the respective lots.

7. Method for inspecting a gear contact pattern between teeth surfaces of mutually engaging gear teeth in a pair of gears comprises steps of determining on each of the teeth surfaces of the gear teeth a plurality of regularly located measuring points so that respective ones of the measuring points on one tooth surface correspond to the measuring points on the other tooth surface so as to provide a plurality of combinations of measuring points, measuring each tooth surface at the measuring points to detect deviations of the tooth surface from a standard tooth profile at the measuring points, calculating relative distances between the teeth surfaces in the pair of gears at corresponding measuring points on the basis of the deviations, determining a reference which is the relative distance of minimum value, dividing the tooth surface into four triangular corner zones and a diamond-shaped center zone, counting number per unit area in each zone of the combinations of measuring points in the pair of mutually engaging teeth surfaces where the relative distances are within a predetermined limit from the reference, and accepting the pair of gears when the counted number in the center zone is not less than in the other zones.

8. Method in accordance with claim 7 which is preceded by a preliminary measuring process which comprises steps of selecting a plurality of gear teeth in each of the pair of gears, measuring each of the gear teeth at a plurality of regularly located measuring points to detect deviations of the gear tooth from a standard tooth profile at the measuring points, obtaining mean values of the deviations of the selected gear teeth at the respective measuring points, and selecting among the gear teeth a specific gear tooth which has largest number of measuring points where the deviations are closest to the mean values to put it to the inspection.

* * * * *